United States Patent
Xue et al.

(10) Patent No.: US 9,226,168 B2
(45) Date of Patent: Dec. 29, 2015

(54) APN-AMBR AUTHORIZATION IN GPRS MOBILE NETWORK

(71) Applicant: ALCATEL-LUCENT CANADA INC., Ottawa, CA (US)

(72) Inventors: Xiong Xue, Kanata (CA); Haiqing H. Ma, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 266 days.

(21) Appl. No.: 13/965,717

(22) Filed: Aug. 13, 2013

(65) Prior Publication Data

US 2015/0049603 A1    Feb. 19, 2015

(51) Int. Cl.
| | |
|---|---|
| *H04J 1/18* | (2006.01) |
| *H04W 24/00* | (2009.01) |
| *H04M 15/00* | (2006.01) |
| *H04W 8/18* | (2009.01) |

(52) U.S. Cl.
CPC .............. *H04W 24/00* (2013.01); *H04M 15/00* (2013.01); *H04W 8/18* (2013.01)

(58) Field of Classification Search
None
See application file for complete search history.

(56) References Cited

U.S. PATENT DOCUMENTS

| | | | |
|---|---|---|---|
| 2011/0138066 A1* | 6/2011 | Kopplin et al. | 709/228 |
| 2012/0002540 A1* | 1/2012 | Siddam et al. | 370/230 |
| 2012/0224476 A1* | 9/2012 | Jin et al. | 370/229 |
| 2013/0231081 A1* | 9/2013 | Mo et al. | 455/405 |

* cited by examiner

*Primary Examiner* — Kibrom T Hailu

(74) *Attorney, Agent, or Firm* — Kramer & Amado, P.C.

(57) ABSTRACT

Various exemplary embodiments relate to a method performed by a policy and charging rules node (PCRN), the method including: receiving a credit control request (CCR) message from a packet data network gateway (PGW) based upon a general radio packet service (GPRS) internet protocol connectivity access network (IP-CAN) session request; determining that an operator policy rule specifies an aggregate maximum bit rate (APN-AMBR) value; determining that the CCR message includes an APN-AMBR value; setting an APN-AMBR value for the GPRS IP-CAN session to the APN-AMBR value specified by the operator policy rule; setting a GPRS IP-CAN session maximum bit rate download/upload (MBR DL/UL) value to the lowest of the APN-AMBR value specified by the operator policy rule and a subscriber MBR DL/UL value; and sending a credit control answer (CCA) message to the PGW with the selected APN-AMBR and MBR DL/UL values.

10 Claims, 6 Drawing Sheets

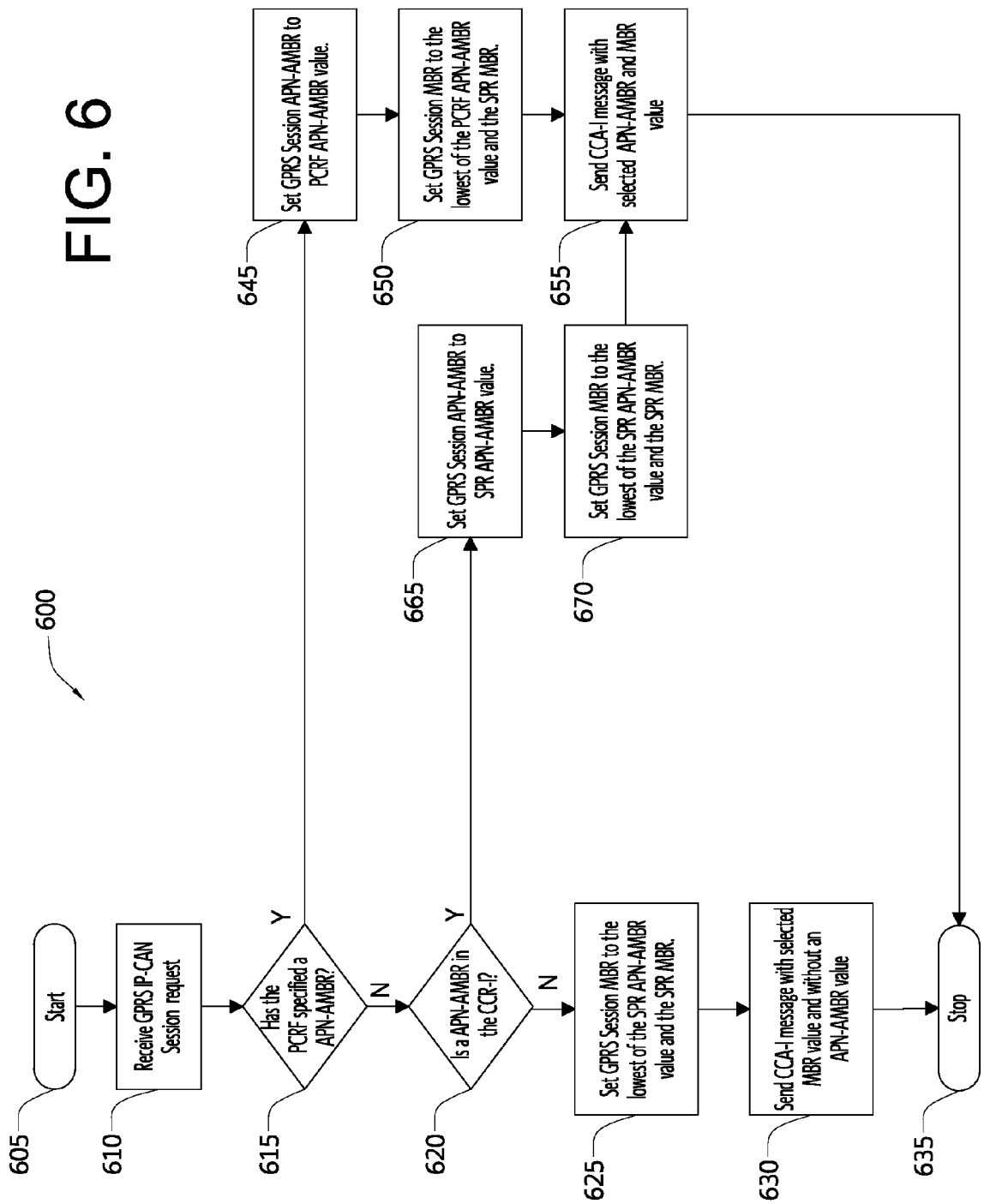

APN-AMBR AUTHORIZATION IN GPRS MOBILE NETWORK

TECHNICAL FIELD

Various exemplary embodiments disclosed herein relate generally to communications networking.

BACKGROUND

General radio packet service (GPRS) is a packet oriented data service on the 2G and 3G cellular communication system's global system for mobile communication (GSM). GPRS is a best effort packet based service where a user is charged for data usage. GPRS is now part of the 3rd generation partnership project (3GPP). When a GPRS service request is made an access point name aggregate maximum bit rate (APN-AMBR) may specify the AMBR that the service requests. The APN-AMBR services as a limit on the amount of bandwidth that may be consumed by the session.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections, Various embodiments described herein relate to a method performed by a policy and charging rules node (PCRN), the method including: receiving a credit control request (CCR) message from a packet data network gateway (PGW) based upon a general radio packet service (GPRS) internet protocol connectivity access network (IP-CAN) session request; determining that an operator policy rule specifies an aggregate maximum bit rate (APN-AMBR) value; determining that the CCR message includes an APN-AMBR value; setting an APN-AMBR value for the GPRS IP-CAN session to the APN-AMBR value specified by the operator policy rule; setting a GPRS IP-CAN session maximum bit rate download/upload (MBR DL/UL) value to the lowest of the APN-AMBR value specified by the operator policy rule and a subscriber MBR DL/UL value; and sending a credit control answer (CCA) message to the PGW with the selected APN-AMBR and MBR DL/UL values.

Various embodiments described herein relate to a method performed by a policy and charging rules node (PCRN), the method including: receiving a credit control request (CCR) message from a packet data network gateway (PGW) based upon a general radio packet service (GPRS) internet protocol connectivity access network (IP-CAN) session request; determining that no operator policy rule specifies an aggregate maximum bit rate (APN-AMBR) value; determining that the CCR message includes an APN-AMBR value; setting an APN-AMBR value for the GPRS IP-CAN session to an APN-AMBR value for a subscriber associated with the GPRS IP-CAN session; setting a GPRS IP-CAN session maximum bit rate download/upload (MBR DL/UL) value to the lowest of the subscriber APN-AMBR value and a subscriber MBR DL/UL value; and sending a credit control answer (CCA) message to the PGW with the selected APN-AMBR and MBR DL/UL values.

Various embodiments described herein relate to a method performed by a policy and charging rules node (PCRN), the method including: receiving a credit control request (CCR) message from a packet data network gateway (PGW) based upon a general radio packet service (GPRS) internet protocol connectivity access network (IP-CAN) session request; determining that no operator policy rule specifies an aggregate maximum bit rate (APN-AMBR) value; determining that the CCR message does not include an APN-AMBR value; setting a GPRS IP-CAN session maximum bit rate download/upload (MBR DL/UL) value to the lowest of a subscriber APN-AMBR value and a subscriber MBR DL/UL value; and sending a credit control answer (CCA) message to the PGW with the selected APN-MBR DL/UL values and without an APN-AMBR value.

BRIEF DESCRIPTION OF THE DRAWINGS

In order to better understand various exemplary embodiments, reference is made to the accompanying drawings, wherein:

FIG. 6 illustrates a method used by the PCRN to determine the AN-AMBR and MBR DL/UL values for a GPRS session.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Long term evolution (LTE) systems may include the use of GPRS networks. Legacy GPRS networks may not use APN-AMBR AVP, while newer GPRS networks may use APN-AMBR to regulate non-GBR bearers of a GPRS session. Furthermore, it is desirable to be able to specify GPRS session APN-AMBR according to different subscriber profiles, and the changes to the subscriber profile should be reflected dynamically in APN-AMBR of the corresponding session. When a mobile user moves from different GPRS access networks, e.g. from an network where APN-AMBR is not used to a network where APN-AMBR is used or from a network where APN-AMBR is used to a network where APN-AMBR is not used, this change needs to be reflected in PCRF decision. There is a need to develop comprehensive strategy in the implementation of an LTE system in order to address above mentioned challenges. Embodiments of systems and methods to address these issues with APN-AMBR are described below. In these embodiments, a subscriber APN-AMBR or an APN-AMBR authorized by a policy and charging rules node (PCRN) may be used in setting for the GPRS session as described in greater detail below.

Figure 1:
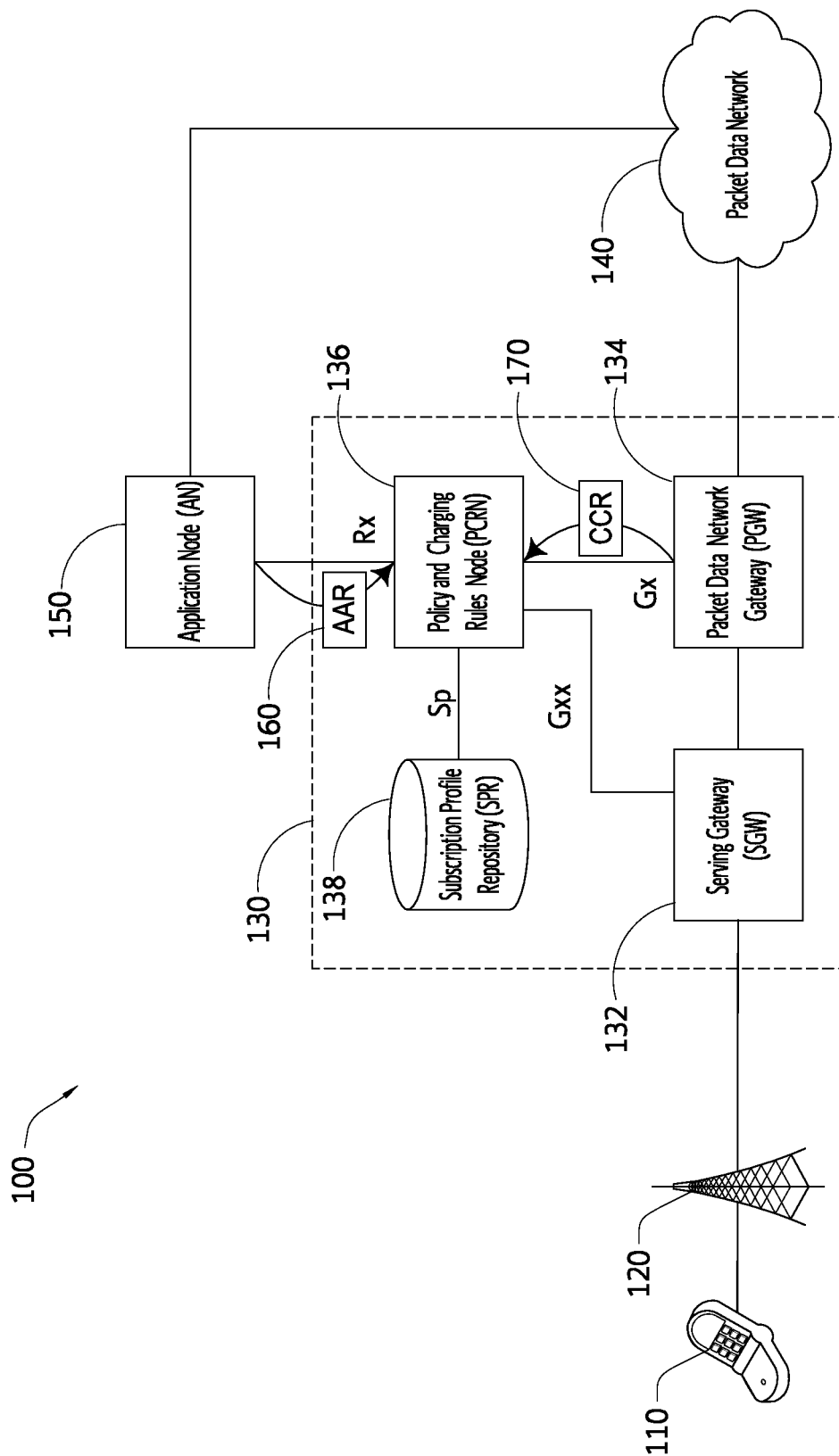
FIG. 1 illustrates an exemplary subscriber network 100 for providing various data services.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136 and a subscriber profile repository (SPR) 138.

Serving gateway (SGW) 132 may be a device that manages data paths between the base station 120 and PGW 134. The data paths may include virtual containers called bearers with unique Quality of Service (QoS) characteristics. The bearers may include virtual connections called service data flows (SDFs). In various embodiments where user equipment 110 is a mobile device and base station 120 is an eNodeB, SGW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). The PGW may act as a gateway GPRS support node (GGSN) when the subscriber network 100 implements a GPRS network. PGW 134 may request new PCC rules from PCRN 136 by sending a CCR message via the Gx interface. PGW 134 may also include a number of additional features such as, for example, packet filtering, deep packet inspection, and subscriber charging support.

Policy and charging rules node (PCRN) 136 may be a device that receives requests for application services, generates PCC rules, and provides PCC rules to the PGW 134 and/or other PCENs (not shown). PCRN 136 may be in communication with AN 150 via an Rx interface. PCRN 136 may receive a service request in the form of an AA-Request (AAR) 160 from AN 150. PCRN 136 may also be in communication with SGW 132 and PGW 134 via a Gxx and a Gx interface, respectively. PCRN 136 may receive a service request in the form of a credit control request (CCR) 170 from SGW 132 or PGW 134. In various embodiments, AAR 160 and CCR 170 may represent two independent service requests to be processed separately, while in other embodiments, AAR 160 and CCR 170 may carry information regarding a single service request and PCRN 136 may create at least one PCC rule based on the combination of AAR 160 and CCR 170. In various embodiments, PCRN 136 may be capable of handling both single-message and paired-message service requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

As will be discussed in further detail below, PCRN 136 may receive a request to update a PCC rule with new filters. PCRN 136 may receive an update CCR 170 from PGW 134 indicating one or more new filters and a reference filter. PCRN 136 may determine an existing PCC rule and related information based on the reference filter. PCRN 136 may determine new QoS-information for the PCC rule using information regarding the new filters and existing filters. PCRN 136 may also control for removed filters and flow direction. PCRN 136 may generate a new PCC rule to replace the existing PCC rule.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, subscriber priority, and subscriber service preferences.

Packet data network 140 may be any network for providing data communications between user equipment 110 and other devices connected to packet data network 140, such as AN 150. Further, packet data network 140 may provide, for example, phone and/or Internet service to various user devices in communication with packet data network 140.

Application Node (AN) 150 may be a device that provides an application service to user equipment 110. Thus, AN 150 may be a server or other device that provides, for example, streaming video service to user equipment 110. AN 150 may further be in communication with the PCRN 136 of the EPC 130 via an Rx interface. When AN 150 is to begin providing application service to user equipment 110, AN 150 may generate a service request message, such as an AA-Request (AAR) according to the Diameter protocol, to notify the PCRN 136 that resources should be allocated for the application service. Such an service request message may include information such as an identification of the subscriber using the application service and an identification of the particular SDFs and filters that must be established within an internet protocol connectivity access network (IP-CAN) session in order to provide the requested service. AN 150 may communicate such an service request to the PCRN via the Rx interface 215.

Four examples will be described below illustrating embodiments that set the APN-AMBR in various situations.

Figure 2:
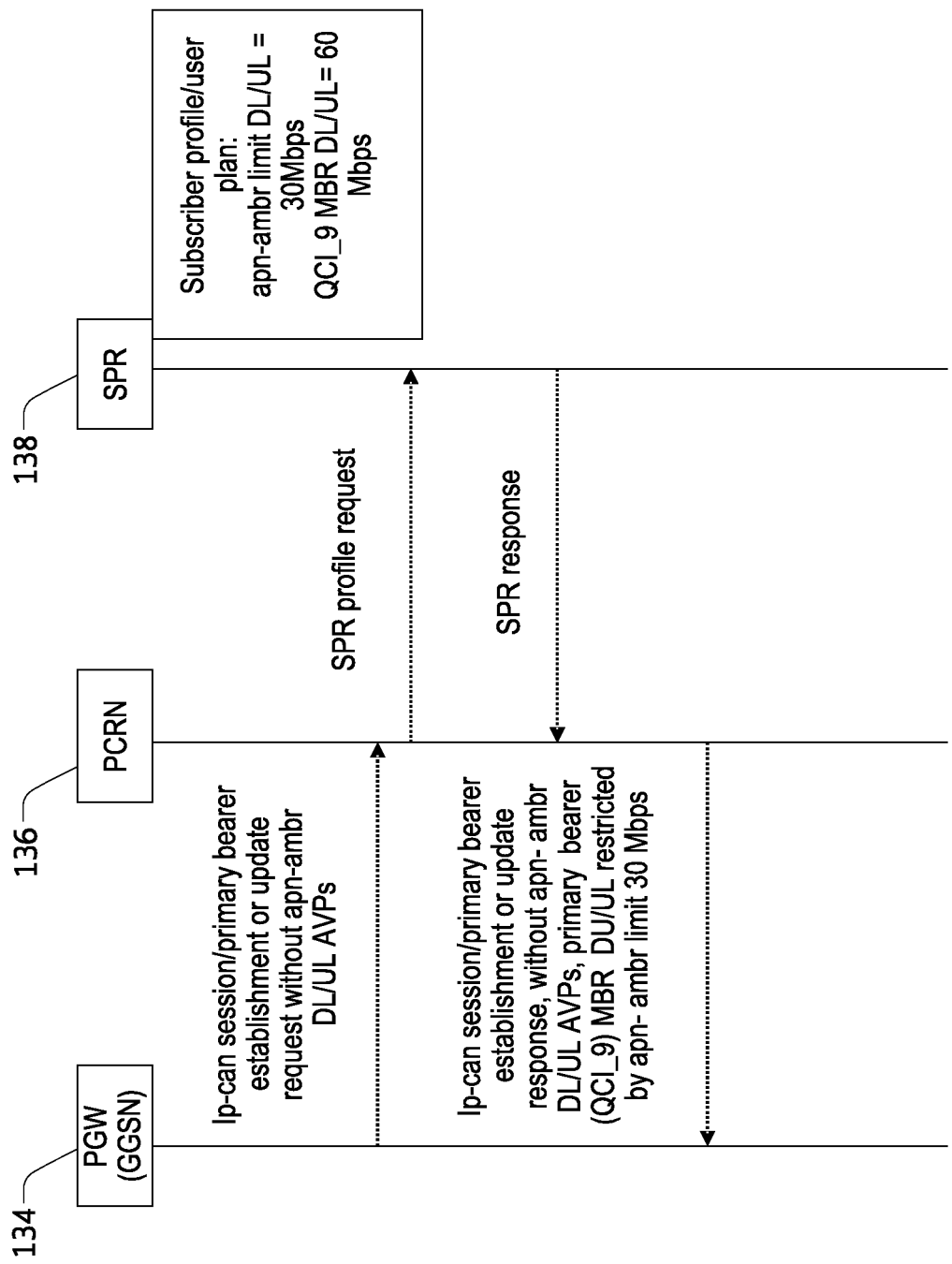
FIG. 2 illustrates a first example of message flow regarding APN-AMBR.

FIG. 2 illustrates a first example of message flow regarding APN-AMBR. In this example, the PGW 134 sends a CCR without the APN-AMBR DL/UL AVPs (download/upload attribute value pairs) or QCI_9 maximum bit rate download/upload (MBR DL/UL) AVPs to the PCRN 136. The PCRN 136 sends a SPR profile request to the SPR 138 to request the APN-AMBR and MBR DL/UL information of the subscriber. The SPR 138 sends a response to the PCRN 136 indicating that the APN-AMBR limit DL/UP=30 Mbps and that the QCI_9 MBR DL/UL=60 Mbps. The PCRN 136 determines that the primary bearer QCI_9 MBR DL/UL value should be 30 Mpbs based upon the APN-AMBR limit of 30 Mbps even though the subscriber has an authorized QCI_9 MBR DL/UL=60 Mbps. In this case the lower APN-AMBR value is the limiting value and hence becomes the limit. The PCRN 136 then sends a CCA message indicating that the QCI_9 MBR DL/UL=30 Mbps and does not specify an APN-AMBR because there was no APN-AMBR specified in the CCR received from the PGW 134. In the above description as well as the descriptions below, the CCR and CCA messages may be initialization messages or modification messages.

Figure 3:
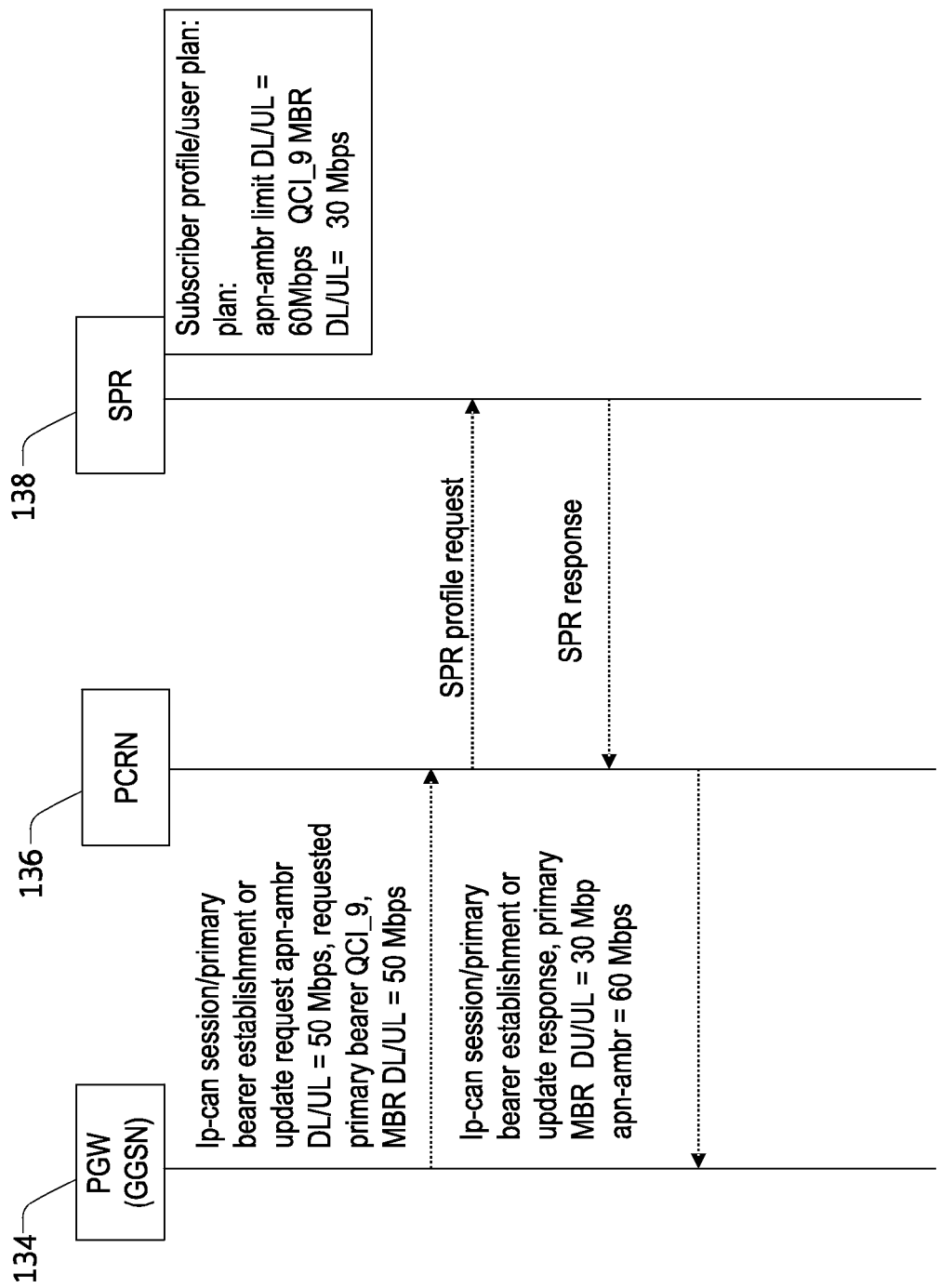
FIG. 3 illustrates a second example of message flow regarding APN-AMBR.

FIG. 3 illustrates a second example of message flow regarding APN-AMBR. In this example, the PGW 134 sends a CCR with the APN-AMBR DL/UL=50 Mbps and the QCI_9 MBR DL/UL 50 Mbps to the PCRN 136. The PCRN 136 sends a SPR profile request to the SPR 138 to request the APN-AMBR and MBR DL/UL information of the subscriber. The SPR 138 sends a response to the PCRN 136 indicating that the APN-AMBR limit DL/UL=60 Mbps and that the QCI_9 MBR DL/UL=30 Mbps. The PCRN 136 determines that the APN-AMBR value should be 60 mbps based upon the subscribers APN-AMBR value. The PCRN 136 determines that the primary bearer QCI_9 MBR DL/UL value should be 30 Mpbs based upon the QCI_9 MBR DL/UL limit of 30 Mbps even though the subscriber has an authorized APN-AMBR=60 Mbps. In this case the lower QCI_9 MBR DL/UL value is the limiting value and hence becomes the limit. The PCRN 136 then sends a CCA message indicating that the QCI_9 MBR DL/UL=30 Mbps and that the APN-AMBR=60 Mbps.

Figure 4:
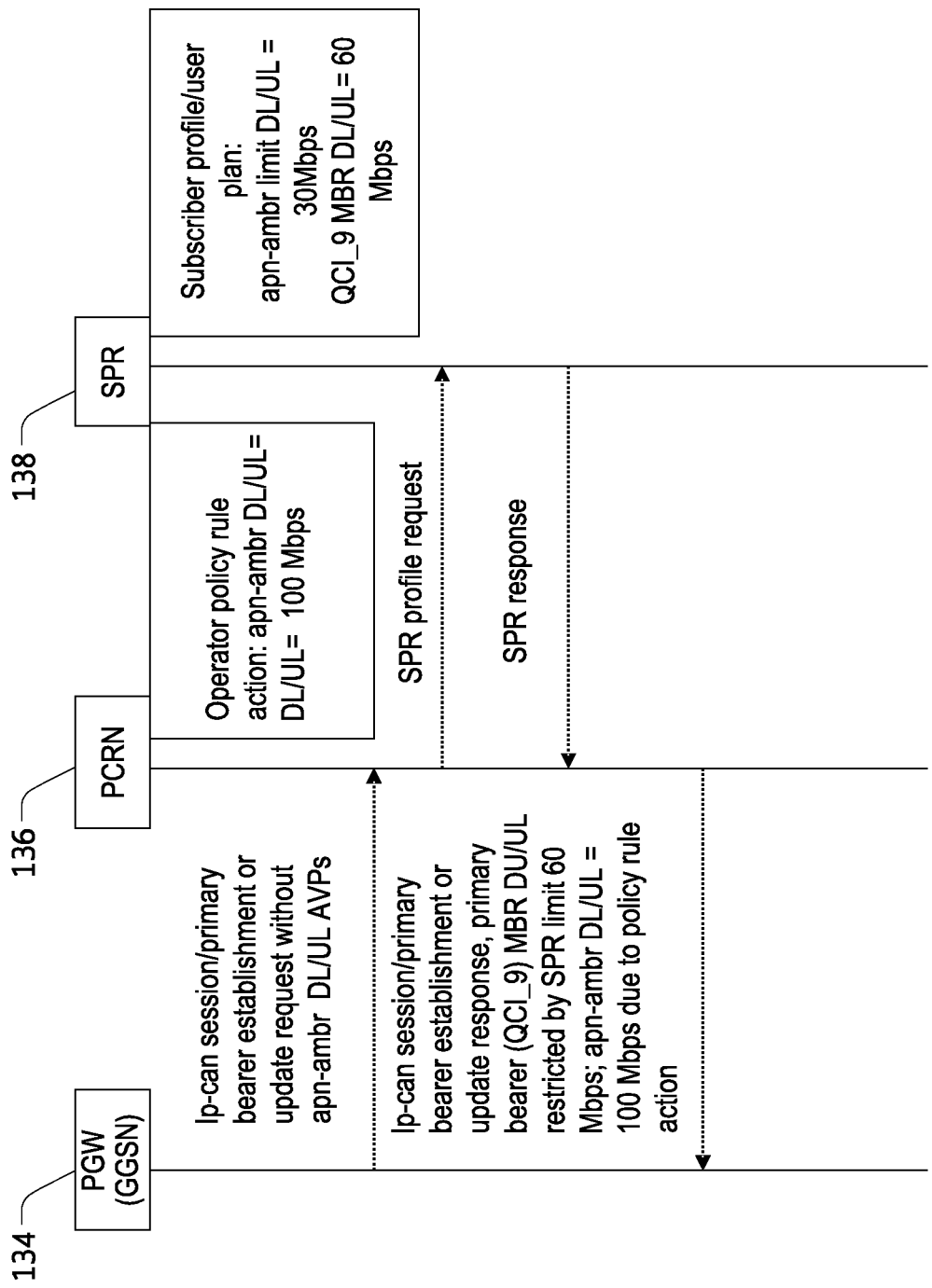
FIG. 4 illustrates a third example of message flow regarding APN-AMBR.

FIG. 4 illustrates a third example of message flow regarding APN-AMBR. In this example, the PGW 134 sends a CCR without the APN-AMBR DL/UL AVPs (download/upload attribute value pairs) or QCI_9 MBR DL/UL AVPs to the PCRN 136. The PCRN 136 determines that an operator policy rule action sets the APN-AMBR=100 Mbps. The PCRN 136 sends a SPR profile request to the SPR 138 to request the APN-AMBR and MBR DL/UL information of the subscriber. The SPR 138 sends a response to the PCRN 136 indicating that the APN-AMBR limit DL/UP=30 Mbps and that the QCI_9 MBR DL/UL=60 Mbps. The PCRN 136 determines that the APN-AMBR value should be 100 Mbps based upon the operator policy rule. The PCRN 136 determines that the primary bearer QCI_9 MBR DL/UL value should be 60 Mpbs based upon the QCI_9 MBR DL/UL limit of 60 Mbps even though the subscriber has an authorized APN-AMBR=30 Mbps. In this case the APN-AMBR value has been set to 100 Mpbs so the subscriber QCI_9 MBR DL/UL value of 60 Mbps is the limiting value and hence becomes the limit. The PCRN 136 then sends a CCA message indicating that the QCI_9 MBR DL/UL=60 Mbps and that the APN-AMBR=100 Mbps.

Figure 5:
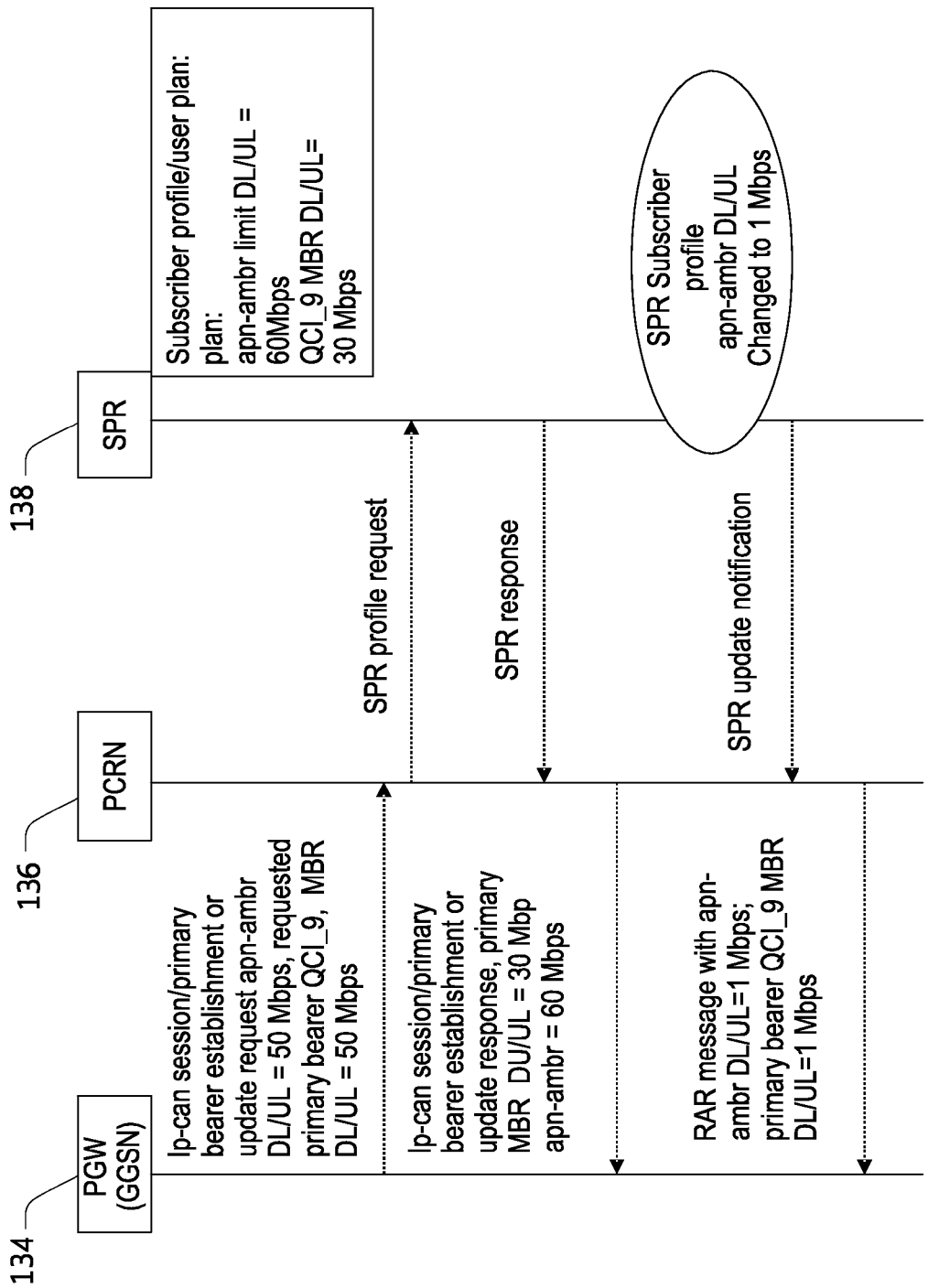
FIG. 5 illustrates a fourth example of message flow regarding APN-AMBR.

FIG. 5 illustrates a fourth example of message flow regarding APN-AMBR. This example begins the same as that in FIG. 3. The PGW 134 sends a CCR with the APN-AMBR DL/UL=50 Mbps and the QCI_9 MBR DL/UL 50 Mbps to the PCRN 136. The PCRN 136 sends a SPR profile request to the SPR 138 to request the APN-AMBR and MBR DL/UL information of the subscriber. The SPR 138 sends a response to the PCRN 136 indicating that the APN-AMBR limit DL/UL=60 Mbps and that the QCI_9 MBR DL/UL=30 Mbps. The PCRN 136 determines that the APN-AMBR value should be 60 mbps based upon the subscribers APN-AMBR value. The PCRN 136 determines that the primary bearer QCI_9 MBR DL/UL value should be 30 Mpbs based upon the QCI_9 MBR DL/UL limit of 30 Mbps even though the subscriber has an authorized APN-AMBR=60 Mbps. In this case the lower QCI_9 MBR DL/UL value is the limiting value and hence becomes the limit. The PCRN 136 then sends a CCA message indicating that the QCI_9 MBR DL/UL=30 Mbps and that the APN-AMBR=60 Mbps. Next, the subscriber profile APN-AMBR is changed to 1 Mbps from 60 Mbps. The SPR 138 sends a SPR update notification to the PCRN 136. The PCRN determines that the new subscriber APN-AMBR of 1 Mbps is now the limiting factor for the session. Accordingly, the PCRN 136 then sends a RAR message indicating that the QCI_9 MBR DL/UL=1 Mbps and that the APN-AMBR=1 Mbps FIG. 6 illustrates a method used by the PCRN to determine the AN-AMBR and MBR DL/UL values for a GPRS session. The method begins at step 605. The PCRN 136 first receives CCR for a GPRS IP-CAN session request 610. Next, the PCRN 136 determines if an operator policy rule action for the APN-AMBR has been specified 615. If not, the PCRN 136 next determines if the CCR includes an APN-AMBR 620. If not, then the PCRN sets the GPRS session MBR DL/UL to the lowest of the subscriber APN-AMBR and the subscriber MBR DL/UL 625. The PCRN 136 then sends a CCA message to the PGW 134 with the selected MBR DL/UL value and without an APN-AMBR value 630. The method then ends at 635.

If an operator policy rule action for the APN-AMBR has been specified 615, the PCRN sets the GPRS session APN-AMBR to the APN-AMBR value specified by the operator policy rule action 645. Next, the PCRN 136 sets the GPRS session MBR DL/UL to the lowest of the operator specified APN-AMBR and the subscriber MBR DL/UL 650. The PCRN 136 then sends a CCA message to the PGW 134 with the selected APN-AMBR and MBR DL/UL values 655. The method then ends at 635.

If the PCRN 136 determines that the CCR includes an APN-AMBR 620, the PCRN 136 sets the GPRS session APN-AMBR to the subscriber APN-AMBR value 655. The PCRN 136 then sets the GPRS session MBR DL/UL to the lowest of the subscriber APN-AMBR and the subscriber MBR DL/UL 670. The PCRN 136 then sends a CCA message to the PGW 134 with the selected APN-AMBR and MBR DL/UL values 655. The method then ends at 635.

The method described in FIG. 6 may also be used when the subscriber APN-AMBR is updated. In such a case, the PCRN would receive a SPR update notification at 610. Further, the PCRN 136 would send a RAR message to the PGW 134 instead of a CCA message to update the APN-AMBR and MBR DL/UL values at steps 630 and 655. Otherwise, the APN-AMBR and MBR DL/UL values will be selected in the same manner.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a policy and charging rules node (PCRN), the method comprising:
   receiving a credit control request (CCR) message from a packet data network gateway (PGW) based upon a general radio packet service (GPRS) internet protocol connectivity access network (IP-CAN) session request;
   determining that an operator policy rule specifies an access point name aggregate maximum bit rate (APN-AMBR) value;
   setting an APN-AMBR value for the GPRS IP-CAN session to the APN-AMBR value specified by the operator policy rule;
   setting a GPRS IP-CAN session maximum bit rate download/upload (MBR DL/UL) value to the lowest of the APN-AMBR value specified by the operator policy rule and a subscriber MBR DL/UL value; and
   sending a credit control answer (CCA) message to the PGW with a selected APN-AMBR and MBR DL/UL values.

2. The method of claim 1, further comprising:
   sending a subscriber profile repository (SPR) request message to a SPR;
   receiving a SPR response message from the SPR including a subscriber APN-AMBR and the subscriber MBR DL/UL.

3. The method of claim 1, further comprising:
   receiving a SPR update notification message from the SPR including an updated subscriber APN-AMBR and an updated subscriber MBR DL/UL;
   re-authorizing APN-AMBR and MBR-DL/UL values according to corresponding SPR update, previous GW input and PCRF policy rules;
   sending a request for reauthorization (RAR) message to the PGW with the updated APN-AMBR and MBR DL/UL values.

4. The method of claim 1, wherein the CCR message is a CCR initialize message.

5. The method of claim 1, wherein the CCR message is a CCR update message.

6. A non-transitory program storage device readable by a machine, embodying a program of instructions executable by the machine to perform method steps including:
   receiving a credit control request (CCR) message from a packet data network gateway (PGW) based upon a general radio packet service (GPRS) internet protocol connectivity access network (IP-CAN) session request;
   determining that an operator policy rule specifies an access point name aggregate maximum bit rate (APN-AMBR) value;
   setting an APN-AMBR value for the GPRS IP-CAN session to the APN-AMBR value specified by the operator policy rule;
   setting a GPRS IP-CAN session maximum bit rate download/upload (MBR DL/UL) value to the lowest of the APN-AMBR value specified by the operator policy rule and a subscriber MBR DL/UL value; and
   sending a credit control answer (CCA) message to the PGW with the selected APN-AMBR and MBR DL/UL values.

7. The non-transitory program storage device of claim 6, the method steps further including:
   sending a subscriber profile repository (SPR) request message to a SPR;
   receiving a SPR response message from the SPR including a subscriber APN-AMBR and the subscriber MBR DL/UL.

8. The non-transitory program storage device of claim 6, the method steps further including:
   receiving a SPR update notification message from the SPR including an updated subscriber APN-AMBR and an updated subscriber MBR DL/UL;
   re-authorizing APN-AMBR and MBR-DL/UL values according to corresponding SPR update, previous GW input and PCRF policy rules;
   sending a request for reauthorization (RAR) message to the PGW with the updated APN-AMBR and MBR DL/UL values.

9. The non-transitory program storage device of claim 6, wherein the CCR message is a CCR initialize message.

10. The non-transitory program storage device of claim 6, wherein the CCR message is a CCR update message.

* * * * *